United States Patent

Ishii et al.

[11] Patent Number: 5,053,481
[45] Date of Patent: Oct. 1, 1991

[54] WHOLLY AROMATIC POLYESTER FILM

[75] Inventors: Toshinori Ishii, Okayama; Masanori Sato, Osaka, both of Japan

[73] Assignee: Kuraray Co., Ltd., Kurashiki, Japan

[21] Appl. No.: 365,729

[22] Filed: Jun. 14, 1989

[30] Foreign Application Priority Data

Jun. 17, 1988 [JP] Japan .................................. 63-150437

[51] Int. Cl.$^5$ ............................................ C08G 63/06
[52] U.S. Cl. ..................... 528/206; 264/291; 528/86; 528/271
[58] Field of Search ...................... 528/206, 86, 271

[56] References Cited

U.S. PATENT DOCUMENTS 4,161,470  7/1979  Calundann ..................... 528/206
4,673,724  6/1987  Endoh et al. .................. 528/206

Primary Examiner—Harold D. Anderson

[57] ABSTRACT

A wholly aromatic polyester film, (A) which is made of a wholly aromatic polyester consisting essentially of the following recurring units I and II

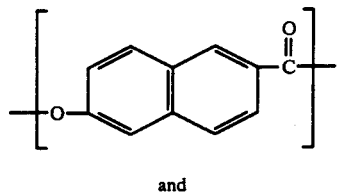

and

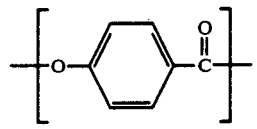

wherein the aromatic ring may be optionally substituted with at least one substituent selected from the group consisting of an alkyl group having 1 to 4 carbon atoms, an alkoxy group having 1 to 4 carbon atoms, a halogen atom and a phenyl group, said wholly aromatic polyetser comprising 10 to 90 mol % of the recurring unit I and 90 to 10 mol % of the recurring unti II, being capable of forming an optically anisotropic melt phase, and having a melt strength at a temperature 20° C. higher than its transition temperature to liquid crystal of at least 2.0 g/mm$^2$; (B) said film having an oxygen permeability of not more than 1.0 cc. 20 $\mu$/m$^2$. day. atm at a temperature 20° C. and a relative humidity 65%; and (C) said film having thermal shrinkages both in the machine direction and in a direction perpendicular thereto of not more than 1% at a temperature 250° C. Said wholly aromatic polyester film can be produced by melt-extruding a wholly aromatic polyester to form into a film under conditions that a shear rate applied to the wholly aromatic polyester in a molten state at the exit of the molding die is not less than 500 sec$^{-1}$.

6 Claims, No Drawings

WHOLLY AROMATIC POLYESTER FILM

This invention relates to a film made of a wholly aromatic polyester capable of forming an optically anisotropic melt phase, and the process for producing same.

It is known that extension through a slit of a polyester known as thermotropic liquid crystal polyester which forms an optically anisotropic melt phase, without disturbing the orientation of the liquid crystal, can give a film having a high strength and a high elastic modulus as extruded. However, such film has a high tensile strength only in the machine direction (hereinafter referred to as "MD direction") and has an extremely low tensile property in a direction perpendicular to the machine direction (hereinafter referred to as "TD direction"). The film therefore readily tears and generates fibrils, thereby suffering a great restriction in the use.

U.S. Pat. No. 4,161,470 already disclosed that the wholly aromatic polyester used in the present invention forms an optically anisotropic melt phase and is readily melt-molded to give molded articles having excellent mechanical properties.

Conventional film formation of polyesters generally employs a shear rate of 200 sec$^{-1}$ or so, film formation with a shear rate employed therefor exceeding 500 sec$^{-1}$ has been known. For example, shear rates of 150 sec$^{-1}$ or so employed in the film formation of polyethylene terephthalate are found in the literature.

Also known is that a polyester film formation having uniform mechanical properties both in MD and in TD direction can be obtained by simultaneously biaxially stretching an optically anisotropic melt phase-forming polyester in a molten state by blown film process such that the blow ratio is at least 2.5 times the draw ratio. (See Japanese Patent Application Laid-Open No. 102234/1986.)

U.S. Pat. No. 4,161,470 does not specifically describe a process for forming a film using a wholly aromatic polyester disclosed therein or the properties of the obtained film.

The wholly aromatic polyester used in the present invention can never be formed into a film at a low shear rate as employed in the usual film formation. The process of film formation of Japanese Patent Application Laid-Open No. 102234/1986 was tried, but, then, formability was bad and a smooth film formation was difficult to attain.

An object of the present invention is to provide a wholly aromatic polyester film being excellent in mechanical properties both in MD direction and in TD direction, and in dimensional stability and gas barrier properties.

Another object of the present invention is to provide a process for the commercially advantageous production of the wholly aromatic polyester film.

Other object and advantages of this invention will become apparent from the following description.

According to the invention, there is provided a wholly aromatic polyester film,
(A) which is made of a wholly aromatic polyester consisting essentially of the following recurring units I and II

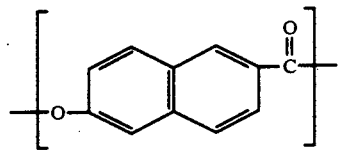

and

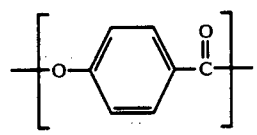

wherein the aromatic ring may be optionally substituted with at least one substituent selected from the group consisting of an alkyl group having 1 to 4 carbon atoms, an alkoxy group having 1 to 4 carbon atoms, a halogen atom and a phenyl group,
said wholly aromatic polyetser comprising 10 to 90 mol % of the recurring unit I and 90 to 10 mol % of the recurring unit II,
being capable of forming an optically anisotropic melt phase, and
having a melt strength at a temperature 20° C. higher than its transition temperature to liquid crystal of at least 2.0 g/mm$^2$;
(B) said film having an oxygen permeability of not more than 1.0 cc·20 $\mu$/m$^2$·day·atm at a temperature 20° C. and a relative humidity 65%; and
(C) said film having thermal shrinkages both in the machine direction and in a direction perpendicular thereto of not more than 1% at a temperature 250° C.

According to this invention, there is also provided a process for producing a wholly aromatic polyester film, which comprises melt-extruding the wholly aromatic polyester specified in above (A) to form it into a film under conditions that a shear rate applied to the wholly aromatic polyester in a molten state at the exit of the molding die is not less than 500 sec$^{-1}$.

The wholly aromatic polyester which gives the film of this invention comprises two kinds of the recurring units I and II. The recurring unit I has 6-oxy-2-naphthoyl structure and is derived from 6-oxy-2-naphthoic acid or functional derivatives thereof. The naphthalene ring of the recurring unit I may be optionally substituted with at least one substituent selected from the group consisting of an alkyl group having 1 to 4 carbon atoms, an alkoxy group having 1 to 4 carbon atoms, halogen and a phenyl group. However it is generally preferred that the substituent be not present. It is necessary for achieving the extrusion-molding of the wholly aromatic polyester that the recurring unit I be contained in the wholly aromatic polyester in an amount of 10 to 90 mol %, preferably 15 to 35 mol %, more preferably 20 to 30 mol %. The recurring unit II has 4-oxybenzoyl structure and is derived from 4-hydroxybenzoic acid or functional derivatives thereof. The benzene ring in the recurring unit II may, like the recurring unit I, be substituted with at least one substituent selected from the group consisting of an alkyl group having 1 to 4 carbon atoms, an alkoxy group having 1 to 4 carbon atoms, a halogen atom, and a phenyl group. However it is generally preferred that the substituent be not present. The amount of the recurring unit II contained in the wholly aromatic polyester is determined depending on the amount of the recurring unit I in the wholly aromatic polyester, and is in a range of 90 to 10 mol %, preferably 85 to 65 mol %, more preferably 70 to 80 mol %.

The wholly aromatic polyester of this invention consists essentially of the recurring units I and II, and the units are bonded by ester-bond with each other in the molecule. However, the polyester may contain other third components within the limit not to impair the inherent characteristics of the wholly aromatic polyester consisting of the above two components. For example, the polyester further may contain an arylester-forming recurring unit in amounts of not more than 10 mol %, preferably not more than 5 mol %, based on the wholly aromatic polyester. Examples of monomers from which the arylester-forming recurring units may be derived are aromatic dicarboxylic acid such as terephthalic acid, isophthalic acid, 4,4'-di-phenyldicarboxylic acid, diphenylether-4,4'-dicarboxylic acid, and diphenoxyethane-4,4'-dicarboxylic acid; alicyclic dicarboxylic acids such as 1,3-cyclohexanedicarboxylic acid and trans-1,4-cyclohexanedicarboxylic acid; aromatic diols such as hydroquinone, resorcin, 4,4'-dioxydiphenol, 2,6-naphthalenediol and 4,4'-dioxydiphenylether; and alicyclic diols such as trans-1,4-cyclohexanediol and cis-1,4-cyclohexanediol.

When such wholly aromatic polyester is dissolved in pentafluorophenol in a concentration of 0.1% by weight at 60°, it shows an inherent viscosity of not less than 2.5, preferably not less than 3.5, more preferably in the range of 3.5 to 7.5.

The wholly aromatic polyester consisting essentially of the recurring units I and II, used for molding it into a film in this invention, may be those known per se or those produced in the same way as in producing the known wholly aromatic polyester. For example, a suitable polyester can be selectively used from the wholly aromatic polyesters disclosed in U.S. Pat. No. 4,161,470.

The wholly aromatic polyester of the invention is produced by various known esterification reactions, for example by the method described in U.S. Pat. No. 4,161,470, and is generally produced by melt polymerization. For example, the wholly aromatic polyester is, while charging starting raw materials each giving the recurring unit I and the recurring unit II, of which hydroxyl groups have been converted to lower acylesters, produced by so-called acidolysis process.

It is necessary to achieve a successful film formation that the wholly aromatic polyester used in this invention be capable of forming an optically anisotropic melt phase and have a melt strength at a temperature 20° C. higher than its transition temperature to liquid crystal of at least 2.0 g/mm². A wholly aromatic polyester having a melt strength of less than 2.0 g/mm² can hardly be processed into a film.

Furthermore, it is desirable that the wholly aromatic polyester used in this invention has a melt strength at temperature 20° C. higher than the transition temperaure to liquid crystal of at least 3 g/mm², preferably in the range of 4 to 20 g/mm².

The film of this invention is produced, using a known extrusion-molding device provided with a molding die, by melt-extruding the above wholly aromatic polyester through a slit of molding die at a temperature higher than its transition temperature to liquid crystal, e.g. about 250° to about 400° C., preferably about 270° to about 350° C., while extruding the polyester in a molten state at a shear rate of at least 500 sec$^{-1}$ to form it into a film.

A T-die, an annular die, and the like can be used as the die for molding. The lip clearance of the die used is generally 0.1 to 1.0 mm, preferably 0.25 to 0.60 mm. If the lip clearance exceeds 1.0 mm, wavy irregularity and the like will generate in the resulting film, thereby rendering the maintenance of the film shape difficult to assure. Since the molecules of the wholly aromatic polyester orient, upon being subjected to shearing stress at melting, along the shear direction, the pressure to the molding die increases relatively little and hence the film formation encounters no problem even when the lip clearance is small.

The shear rate applied to the molten wholly aromatic polyester at the die exit is preferably not less than 800 sec$^{-1}$, and more preferably not less than 1,200 sec$^{-1}$. The shear rate ($\dot{\gamma}$ sec$^{-1}$) used in this specification is defined by the following formula:

$$\dot{\gamma} = \frac{6Q}{\omega H^2 \rho}$$

wherein

Q: output rate of the wholly aromatic polyester (g/sec)

$\Omega$: width of the molding die (cm)

H: lip clearance of the molding die (cm)

$\pi$: density of the wholly aromatic polyester (g/cm³)

While the T-die process, the blown film process and combinations thereof are used for the film formation, preferred is the blown film process.

Since the wholly aromatic polyester used in this invention cannot be stretched biaxially in the usual way once it is cooled after melting and molding, it is desirable, for increasing its mechanical properties in both MD direction and TD direction, that it be stretched simultaneously both in MD direction and TD direction after the extrusion through the die exit before it is cooled. In the blown film process, the draw ratio and blow ratio are employed to correspond to stretching ratios in MD direction and TD direction in T-die process. The draw ratio corresponds to a stretching ratio in MD direction, and the blow ratio that in TD direction, and they are defined as follows:

$$\text{Blow ratio} = \frac{(\text{folded width}) \times 2}{(\text{diameter of die}) \times \pi}$$

$$\text{Draw ratio} = \frac{\text{lip clearance of die}}{(\text{blow ratio}) \times (\text{film thickness})}$$

In the practice of producing the film of the invention, the stretching ratio in TD direction is at least 1.0 and preferably in the range of from 1.5 to 20, that in MD direction is at least 1.0, and preferably in the range of from 1.25 to 15; and at the same time the stretching ratio in TD direction is at least 1.2 times, especially in the range of 1.2 to 1.4 times that in MD direction. When the stretching ratio in TD direction is less than 1.2 times that in MD direction, it is difficult to obtain a film having mechanical properties well balanced both in the MD direction and the TD direction.

The film formation performed under the above-described conditions can give a wholly aromatic polyester film having the following characteristics: excellent mechanical properties in not only the MD direction but in the TD direction; high resistance to heat with the thermal shrinkage after being kept at 250° C. for 30 minutes of not more than 1.0%, especially not more than 0.8%, both in the MD direction and the TD direction; and a high barrier property with the oxygen permeability at 20° C., 65% RH of not more than 1.0 cc·20 $\mu$/m²·day·atm, preferably not more than 0.8 cc·20 $\mu$/m²·day·atm. Generally the wholly aromatic polyester film thus obtained has a thickness of 5 to 500 microns, preferably 10 to 200 microns, and gives, if desired, upon heat treatment thereof at temperaures of, for example about 200° C. to about 300° C. under tension or at a relaxed state, a film having further improved properties.

The film of this invention can be advantageouly used, for example, as an insulating film, a flexible print circuit substrate, a packaging material, etc.

The invention will be illustrated more specifically by reference to examples. It should be understood that the examples are only for the purpose of explanation of the invention, and the invention is not limited thereto.

Tne properties of transition temperature to liquid crystal, melt strength, oxygen permeability, thermal shrinkage and inherent viscosity used in this specification are values obtained by measuring methods mentioned below.

(1) Transition temperature to liquid crystal

Thermal behavior of specimen is observed with a differential scanning calorimeter (TH-3000, made by Mettler) while the temperature is raised at a rate of 20° C. to locate the peak of the endotherm.

(2) Melt strength

This is measured with capillograph PMP-C (made by Toyo Seiki) at a temperature 20° C. higher than the transition temperature to liquid crystal under conditions of cylinder: 9.55$\phi$×250 mmL, nozzle: 1.0$\phi$×10 mmL, piston speed: 10 mm/min. and take-up speed: 10 m/min. The diameter of strand at 5 mm below the nozzle was used.

(3) Oxygen permeability

Measured with an oxygen permeability tester (OX-TRAN 10/50 A, made by Modern Controls Co.) under conditions of 20° C. and 65% RH.

(4) Thermal shrinkage

A length each is marked on test specimen along its MD direction and TD direction. The specimen is allowed to stand in a high-temperature circulating-air oven (made by TABAI) at 250° C. for 30 minutes. The difference in the length before and after the heat treatment is determined.

(5) Inherent viscosity $\eta$inh

A specimen is dissolved in pentafluorophenol to give a 0.1% by weight solution, and the flow time of the specimen solution in a Uberohde viscometer is measured at 60° C.

Then, the relative viscosity ($\eta$rel) is calculated by dividing the flow time of the specimen solution by that of the pure solution as measured in the same manner, and the inherent viscosity is calculated from the following equation, wherein C means concentration of the specimen solution.

$$\eta\text{inh} = \frac{ln(\eta\text{rel})}{C}$$

EXAMPLE 1

A wholly aromatic polyester consisting of 27 mol % of 6-oxy-2-naphthoyl structure and 73 mol % of 4-oxybenzoyl structure, having a melt strength at 300° C. of 6.3 g/mm² and an inherent viscosity of 5.5 was heat-kneaded at 280° to 300° C. in a single-screw extruder, then melt-extruded through a blown film die having a diameter of 25 mm and a lip clearance of 0.3 mm, and biaxially stretched at a draw ratio and blow ratio of 2.5 and 5.4 respectively, to give a film having a thickness of 22$\mu$ and a good appearance. The then output rate was 7.6 kg/hr, and the shear rate was 1,250 sec$^{-1}$. The properties of the thus obtained film are shown in Table 1.

EXAMPLES 2 THROUGH 6

Example 1 was repeated using the same wholly aromatic polyester and blown film die as used in Example 1 excepting that output rate, draw ratio and blow ratio were changed as shown in Table 1 to obtain various films having a good appearance. The properties of the obtained 20 films are shown in Table 1.

EXAMPLE 7

The same wholly aromatic polyester as used in Example 1 was melt-extruded through a blown film die having a diameter of 25 mm and a lip clearance of 0.2 mm and then biaxially stretched at a draw ratio and blow ratio of 2.3 and 5.4 respectively to give a neatly looking film having a thickness of 16$\mu$. The output rate was 3.3 kg/hr, and the shear rate was 1,250 sec$^{-1}$. The properties of the thus obtained film is shown in Table 1.

COMPARATIVE EXAMPLE 1

The same wholly aromatic polyester as used in Example 1 was melt-extruded through the same blown film die as in Example 1 and then biaxially stretched at a draw ratio and blow ratio of 2.5 and 4.0 respectively to give a film having a thickness of 30$\mu$. The output rate was 2.4 kg/hr, and the shear rate was 400 sec$^{-1}$. The properties of the thus obtained film are shown in Table 1.

The obtained film was poorly shaped, having spots nonuniformly stretched thereon and uneven thicknesses.

COMPARATIVE EXAMPLE 2

Example 1 was repeated except for the lip clearance of the die being 1.0 mm to obtain a film. Then the shear rate was as low as 130 sec$^{-1}$. The film formed had holes thereon and the blown tubular extrusion was unsuccessful.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Molding conditions | | | | | | | | | |
| Output rate (kg/hr) | 7.6 | 7.6 | 5.4 | 5.4 | 3.3 | 3.3 | 3.3 | 2.4 | 7.6 |
| Molding die diameter/ lip clearance (mm) | 25/0.3 | 25/0.3 | 25/0.3 | 25/0.3 | 25/0.3 | 25/0.3 | 25/0.2 | 25/0.3 | 25/1.0 |
| Stretching ratio | | | | | | | | | |

TABLE 1-continued

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Draw ratio | 2.5 | 2.5 | 2.7 | 2.5 | 3.6 | 3.5 | 2.3 | 2.5 | — |
| Blow ratio | 5.4 | 4.0 | 5.0 | 3.8 | 5.2 | 4.2 | 5.4 | 4.0 | — |
| Draw ratio/blow ratio | 2.2 | 1.6 | 1.9 | 1.5 | 1.4 | 1.2 | 2.3 | 1.6 | — |
| Shear rate (sec$^{-1}$) | 1250 | 1250 | 900 | 900 | 550 | 550 | 1250 | 400 | 120 |
| Film properties | | | | | | | | | |
| Thickness (μm) | 22 | 30 | 16 | 23 | 7 | 6 | 16 | 37 | film formation unsuccessful |
| Machine direction | | | | | | | | | |
| Tensile strength (kg/mm$^2$) | 24.4 | 29.2 | 25.6 | 27.1 | 26.2 | 31.1 | 28.3 | 20.1 | |
| Elongation (%) | 4.4 | 3.7 | 4.2 | 3.6 | 3.3 | 4.5 | 3.5 | 4.5 | |
| Elastic modulus (kg/mm$^2$) | 1100 | 1250 | 1430 | 1550 | 1650 | 1800 | 1150 | 800 | |
| Thermal shrinkage (%) | 0.2 | 0.4 | 0.3 | 0.4 | 0.5 | 0.6 | 0.2 | 0.6 | |
| Transverse direction | | | | | | | | | |
| Tensile strength (kg/mm$^2$) | 24.2 | 17.5 | 19.5 | 10.2 | 16.3 | 12.5 | 22.5 | 15.2 | |
| Elongation (%) | 4.1 | 5.0 | 4.1 | 4.6 | 3.2 | 3.6 | 4.7 | 4.0 | |
| Elastic modulus (kg/mm$^2$) | 1047 | 720 | 850 | 700 | 710 | 650 | 960 | 550 | |
| Thermal shrinkage (%) | 0.5 | 0.8 | 0.6 | 0.8 | 0.8 | 0.9 | 0.4 | 1.6 | |
| Oxygen permeability (cc · 20μ/m$^2$ · day · atm) | 0.6 | 0.7 | 0.8 | 0.8 | 0.9 | 0.9 | 0.7 | 3/5 | |

EXAMPLE 8

The same wholly aromatic polyester as used in Example 1 was melt-extruded through a T-die having a width of 200 mm and a lip clearance of 0.2 mm, and stretched at a stretching ratio in the machine direction of 2.5 and at a stretching ratio in a direction perpendicular to the machine direction of 4.0 to give a film having a good appearance and a thickness of 30μ. The output rate was 13.4 kg/hr, and the shear rate was 2,000 sec$^{-1}$. The properties of the thus obtained film is shown in Table 2.

COMPARATIVE EXAMPLE 3

The same wholly aromatic polyester as used in Example 1 was formed into a film through the same T-die and at the same stretching ratios as in Example 8, at an output rate of 2.0 kg/hr and a shear rate of 300 sec$^{-1}$. The obtained film had holes and was hence not shaped as a film.

TABLE 2

|  | Ex. 8 | Comp. Ex. 3 |
|---|---|---|
| Molding conditions | | |
| Output rate (kg/hr) | 13.4 | 2.0 |
| Molding die diameter/lip clearance (mm) | 200/0.2 | 200/0.2 |
| Stretching ratio | | |
| Draw ratio | 2.5 | 2.5 |
| Blow ratio | 4.0 | 4.0 |
| Draw ratio/blow ratio | 1.6 | 1.6 |
| Shear rate (sec$^{-1}$) | 2000 | 300 |
| Film properties | | |
| Machine direction | | |
| Tensile strength (kg/mm$^2$) | 23.5 | film formation unsuccessful |
| Elongation (%) | 3.0 | |
| Elastic modulus (kg/mm$^2$) | 1200 | |
| Thermal shrinkage (%) | 0.5 | |
| Transverse direction | | |
| Tensile strength (kg/mm$^2$) | 19.0 | |
| Elongation (%) | 2.5 | |
| Elastic modulus (kg/mm$^2$) | 1150 | |
| Thermal shrinkage (%) | 0.6 | |
| Oxygen permeability (cc · 20μ/m$^2$ · day · atm) | 0.7 | |

Effect of the Invention

The present invention provides a wholly aromatic polyester film having excellent characteristics including high dimensional stability and oxygen barrier property, and also provides a process for advantageously producing the film on a commercial scale.

What is claimed is:

1. A wholly aromatic polyester film,
   (A) which is made of a wholly aromatic polyester consisting essentially of the following recurring units I and II

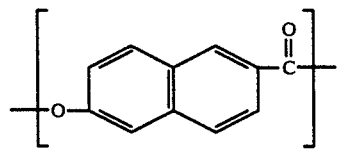

and

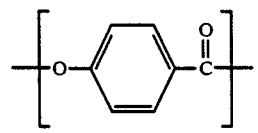

wherein the aromatic ring is optionally substituted with at least one substituent selected from the group consisting of an alkyl group having 1 to 4 carbon atoms, an alkoxy group having 1 to 4 carbon atoms, a halogen atom and a phenyl group, said wholly aromatic polyester comprising 10 to 90 mol % of the recurring unit I and 90 to 10 mol % of the recurring unit II, being capable of forming an optically anisotropic melt phase, and having a melt strength at a temperature 20° C. higher than its transition temperature to liquid crystal of at least 2.0 g/mm$^2$;

(B) said film having an oxygen permeability of not more than 1.0 cc·20 μ/m$^2$·day·atm at a temperature 20° C. and a relative humidity 65%, and (C) said film having thermal shrinkages both in the machine direction and in a direction perpendicular thereto of not more than 1% at a temperature 250° C.

2. The film of claim 1 wherein the wholly aromatic polyester consists essentially of 15 to 35 mol % of the recurring unit I and 85 to 65 mol % of the recurring unit II.

3. The film of claim 1 wherein the melt strength of the wholly aromatic polyester is at least 3.0 g/mm$^2$.

4. The film of claim 1 wherein the oxygen permeability is not more than 0.8 cc·20 μ/m$^2$·day·atm.

5. The film of claim 1 wherein the thermal shrinkage both in the machine direction and in a direction perpendicular thereto is not more than 0.8 % at 250°.

6. The film of claim 1 obtained by the blown film process.

* * * * *

UNITED STATES PATENT AND TRADEMARK OFFICE
CERTIFICATE OF CORRECTION

PATENT NO. : 5,053,481
DATED : October 1, 1991
INVENTOR(S) : Toshinori Ishii and Masanori Sato It is certified that error appears in the above-identified patent and that said Letters Patent is hereby corrected as shown below:

Col. 7, lines 5 and 6, delete "Draw ratio/blow ratio" and insert --Blow ratio/Draw ratio--.

line 26, delete "3/5" and insert --3.5--.

lines 57 and 58, delete "Draw ratio/blow ratio" and insert --Blow ratio/Draw ratio--.

Signed and Sealed this

Thirtieth Day of November, 1993

Attest:

BRUCE LEHMAN

Attesting Officer

Commissioner of Patents and Trademarks